Dec. 8, 1959           F. FAHLAND           2,916,238

FIFTH WHEEL PEDESTAL STRUCTURE

Filed July 19, 1956           3 Sheets-Sheet 1

INVENTOR.
FRANK FAHLAND
BY
Francis T. Burgess
ATTORNEY

*INVENTOR.*
FRANK FAHLAND
BY
*Francis T. Burgess*
ATTORNEY

Dec. 8, 1959  F. FAHLAND  2,916,238
FIFTH WHEEL PEDESTAL STRUCTURE
Filed July 19, 1956  3 Sheets-Sheet 3

*INVENTOR.*
FRANK FAHLAND
BY
*Francis T. Burgess*
ATTORNEY

United States Patent Office 2,916,238
Patented Dec. 8, 1959

2,916,238

FIFTH WHEEL PEDESTAL STRUCTURE

Frank Fahland, Omaha, Nebr.

Application July 19, 1956, Serial No. 598,833

5 Claims. (Cl. 248—119)

The invention relates to devices for supporting highway semi-trailers on railway flat cars and consists particularly in a collapsible fifth wheel supporting pedestal.

The handling of heavy highway semi-trailers on railway flat cars necessitates the use of relatively strong structures for supporting the wheel-less end of the trailer on the car deck. Unless the trailers are to be side loaded on the cars, the more common method of loading them from the ends requires that any trailer supporting structure on the car be capable of being lowered to clear the lowest depending portions of the trailer bodies so as to permit passage of the trailers and tractors over the supporting structure during loading and unloading operations. In my copending application, Serial No. 462,808, filed October 18, 1954, now Patent No. 2,837,038, a flat car deck is provided with a plurality of longitudinally extending and transversely spaced slotted rails which serve the dual purpose of guiding the highway trailer wheels along the deck of the car during loading and unloading operations and of fixing the location of the pedestals lengthwise of the car. A collapsible pedestal consisting of a pair of legs hinged to each other at the top and provided at their lower ends with means engageable with the slots in the rails is also disclosed in my application referred to above. Although very satisfactory in operation, this pedestal structure must be lowered manually to permit the tractor to back under the trailer fifth wheel. Since time is an extremely important factor in the loading and unloading of large numbers of trailers the need for a fifth wheel pedestal which can be raised and lowered more rapidly than those heretofore known became apparent.

Accordingly it is a principal object of the invention to provide an easily lowered and raised pedestal capable of remaining in its raised position unaided when supporting a trailer.

A further object is to provide a fifth wheel pedestal capable of being knocked down by the tractor and automatically swinging to a horizontal position clear of underbody structure on tractor and trailer.

Another object is to provide a structure of this type with means for automatically setting and retaining it in the upright trailer supporting position.

Another object is to provide a structure of this type with means for effectively absorbing vertical shocks so as to prevent their transmission from the trailer-carrying car to the trailer.

These objects and other detailed objects as will be apparent from the following description are attained by the structure illustrated in the accompanying drawings in which.

Figure 3:
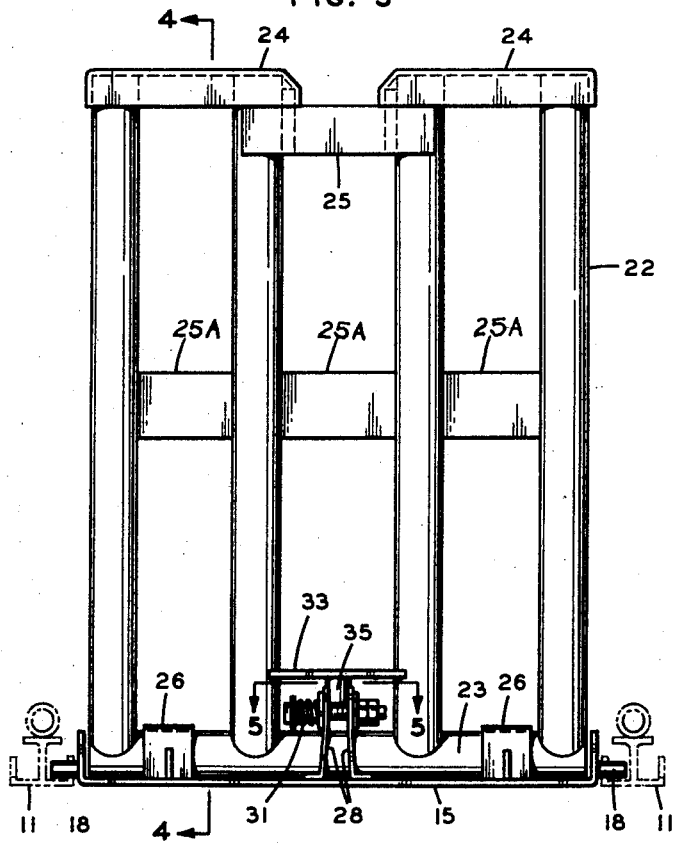
Figure 3 is an end view of the pedestal in its upright position.

The floor of flat car C is provided with a plurality of transversely spaced longitudinally extending slotted rails 11, as disclosed in my co-pending application referred to above, one pair of these rails being located symmetrically with respect to the longitudinal center line of the car and being spaced apart transversely of the car a distance slightly less than the distance intervening between the inner surfaces of the inner dual wheels W of conventional highway trailers T. The rails 11, as best seen in Figure 3, consist of channel members, the webs of which are secured horizontally on the car floor, and the upstanding flanges of which are slotted. A member of T-section is secured at its base to the center of the channel web, the flanges of the T-section being adapted to overlie and prevent the removal of elements extending through the slots in the slotted flanges, for purposes which will appear below.

The pedestal includes a base plate 15 flanged at its sides as at 16 and slightly narrower than the distance between the inner flanges of rails 11. Near their ends flanges 16 are provided with short outwardly extending pins 18 which are adapted to fit into slots 20 in the rails 11. The flange on the T-section portion of rails 11 overlies the ends of pins 18 so as to prevent removal of the base plate from the car and substantial tipping of the base plate about either of its edges. A flat rectangular frame consisting of four normally vertical tubular members 22, a bottom transversely extending horizontal tubular member 23, upper transversely extending horizontal channel-section members 24 and bar members 25, is provided for supporting the trailer fifth wheel. Intermediate horizontal bar members 25a connect adjacent vertical members 22, to provide additional rigidity to the frame. The upper channel members 24 are inverted to form a flat support for the conventional trailer fifth wheel and extend, respectively, only from one of the inner vertical members 22 to the adjacent outer member 22, the inner members 22 being connected at a slightly lower level by bar members 25, so that the fifth wheel king pin may be received in the space between channels 24. Bottom tubular member 23 is rotatably received by transversely spaced inverted U-shaped members 26, which are rigidly secured to and form part of base plate 15. By this arrangement the frame 22, 25 is permitted to swing through an arc of 180 degrees, that is, from vertical to horizontal in either direction lengthwise of the car.

Figure 5:
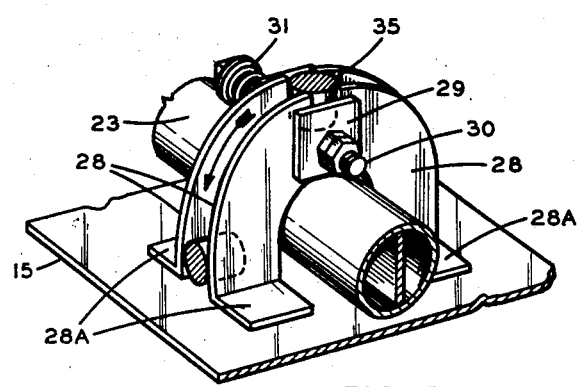
Figure 5 is an enlarged view of the automatic retaining device associated with the pedestal.
Figures 6, 7:
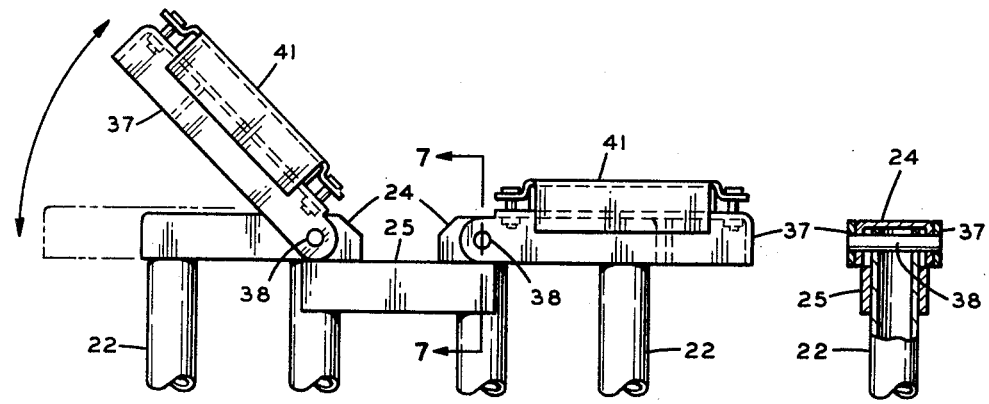
Figure 6 is a fragmentary view of a modification of the pedestal frame having laterally extensible, cushioned fifth wheel supporting arms.
Figure 7 is a vertical sectional view taken along the line 7—7 of Fig. 6.
Figures 8, 9:
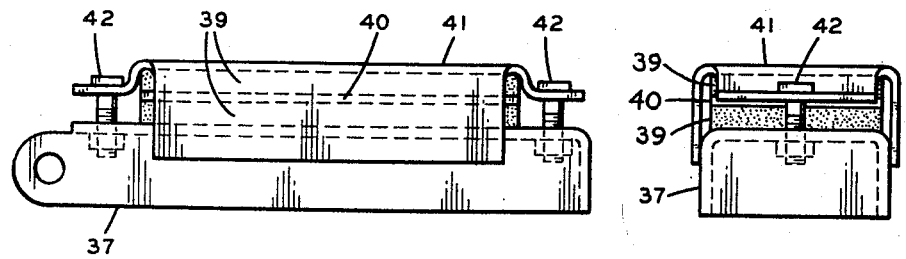
Figure 8 is a side view of the extensible arm.
Figure 9 is an end view of the extensible arm.

For retaining the frame in its vertical position, while at the same time permitting it to be easily lowered when desired, a yieldable gripping device (best seen in Figure 5) is provided. This device consists of a pair of upstanding substantially parallel semi-annular plate structures concentric with the axis of rotation of the frame. Each of the plate structures includes a substantially coplanar pair of plates 28, each formed with a tab 28a at its lower end for attachment to pedestal base plate 15; the upper vertical edges of the coplanar plates 28 are slightly spaced apart longitudinally of the car, and a rectangular plate member 29 is welded to the outer surfaces of the plates across the intervening gap, thus forming an inwardly open shallow recess at the gap. A bolt 30 passes through registering holes in members 29 and mounts a coil spring 31, seated against its head so as to urge the parallel plate structures 28, 29 towards each other. Between the intemediate vertical tubular members 22 of the pedestal framework a flat bar 33 is secured slightly above the upper arcuate edges of plates 28, and dependingly secured to plate 33 is a short cylindrical pin 35, slightly greater in diameter than the space between the coplanar plates. When the frame is vertical, spring pressure urges the recessed portions of the parallel plate structures 28, 29 toward each other into gripping engagement with pin 35 and movement of the pedestal frame from the vertical position is thus yieldably restrained. By applying a horizontal force longitudinally of the car to the upper part of the frame sufficient to move pin 35 out of the recesses, the frame may be urged towards the horizontal position. When such a force is applied to the frame, pin 35 urges the parallel plate structures 28, 29 apart and the frame is permitted to rotate about tubular member 23. As will be most clearly seen in Figure 3 the spacing of the lower portions of the parallel pairs of plates is slightly greater than the diameter of pin 35 so that after the framework has been rotated through a portion of the arc toward horizontal position, the pressure of the plates on the upper side of pin 35 combined with the absence of pressure on the lower side urges the framework to the horizontal position. For moving the framework to the upper position it is only necessary that it be manually swung upwardly, and when it reaches the proper vertical position pin 35 will become engaged in the space between the pairs of plates and no further adjustment or movement is necessary.

Operation of the device is as follows:

When the flat cars are not occupied by trailers the pedestal frameworks are normally in the horizontal position, and are permitted to remain horizontal during loading of trailers on the flat cars to permit passage thereover of the tractors and trailers. When the trailers T are located at desired positions on the flat cars, their dolly wheels D are lowered to provide adequate clearance between the trailer fifth wheels F and the car floor, the pedestals are swung upwardly to their positions and the other trailer retaining means such as tie downs, and wheel blocks are secured. When the cars reach the end of their run, and the securing devices have been removed and the dolly wheels lowered, the tractor backs into position, its rear framing engaging a portion of the pedestal framework and urging it towards the horizontal position, the remainder of the travel of the pedestal framework to the horizontal position being automatically provided as described above. Thus without any manual effort the pedestal is removed from operative position for unloading of the cars.

Figure 1:
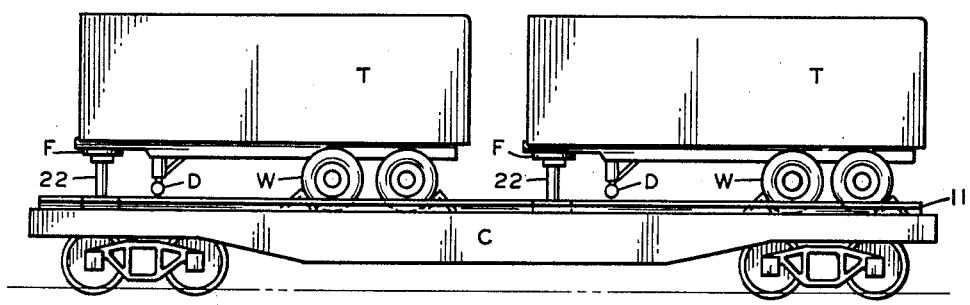
Figure 1 is a side view of a trailer-carrying flat car with two trailers mounted thereon, with the fifth-wheel pedestals in the upright trailer supporting position.
Figure 2:
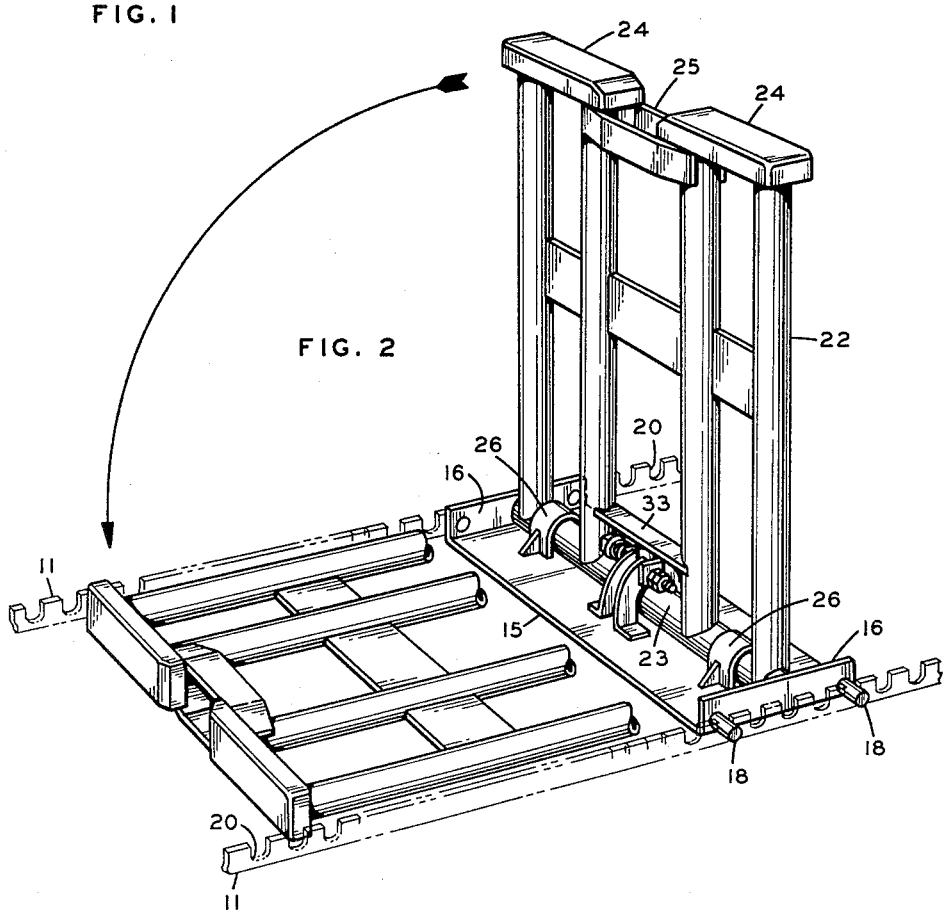
Figure 2 is a perspective view of the pedestal showing it in both the upright and lowered positions.
Figure 4:
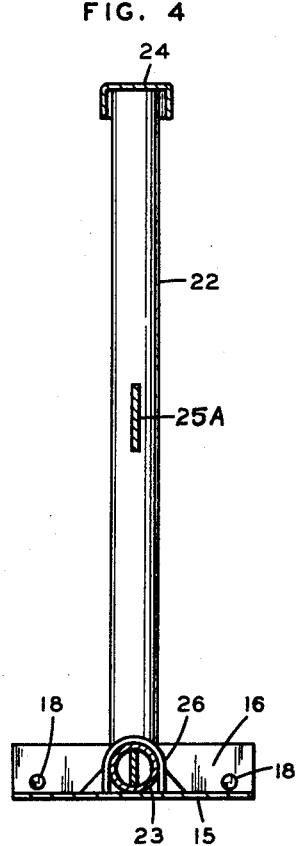
Figure 4 is a vertical sectional view of the pedestal taken along the line 4—4 of Figure 3.

In the modification shown in Figures 6–9, in order to provide increased lateral stability to the semi-trailer body and to distribute the weight of the trailer over a greater area than that afforded by the top of the pedestal framework illustrated in Figures 2–4, a pair of arms 37, of inverted channel section, are pivotally secured at 38 to the inner ends of channel members 24. When extended horizontally into the fifth wheel-supporting position, as shown on the right hand side of Figure 6, the inner surfaces of arm 37 engage the outer surfaces of channel member 24 so as to be rigidly supported thereon. On the left hand side of Figure 6, arm 37 is shown rotated partially towards the vertical position; this enables it to clear the slotted rails 11 when the frame is moved to the horizontal position.

Arms 37 are provided with cushioning means for absorbing vertical shocks. The cushioning means consists of two layers of rubber pads 39, separated by a metal plate 40, the lower pad resting on the top of arm 37. Each of the pads 39 may consist of a plurality of rubber annuli of rectangular cross section, of the type frequently used in railway draft gear. The cushion 39, 40 is held in place on arm 37, and a bearing surface for the fifth wheel is provided, by channel-shaped cover plates 41. The lower surfaces of the horizontal webs of cover plates 41 rest on the upper layer 39, and the inner surfaces of the vertical flanges of plates 41 engage the outer surfaces of the vertical flanges of arms 37. The end portions of the flanges of members 41 are cut away and a gooseneck bend is made in the web to prevent movement of the cushions longitudinally of the arms. Hold-down bolts 42 pass through the web extensions and through the upper surfaces of arms 37 to secure cover plate 41 thereto.

The details of the structure may be varied substantially without departing from the spirit of the invention and the exclusive use of those modifications coming within the scope of the appended claims is contemplated.

What is claimed is:

1. A fifth wheel pedestal comprising a horizontal base member, a normally upstanding load carrying structure, hinge means pivotally securing said load carrying structure to said base member for rotation about a horizontal axis, a pair of spaced substantially semi-annular substantially parallel gripping members concentric with the axis of rotation of said load-carrying structure and secured to said base member, said gripping members having aligned recesses in their opposing faces, resilient means urging said parallel semi-annular members toward one another, and a normally vertical gripped member secured to said load carrying structure and gripped between said semi-annular members.

2. A fifth wheel pedestal according to claim 1 in which the fifth wheel supporting structure is a rectangular frame consisting of tubular upright members, a tubular horizontal bottom member, and flat-topped top members arranged to receive a highway trailer fifth wheel.

3. A fifth wheel pedestal according to claim 2 in which the bottom tubular member forms the pintle of the hinge means and in which the semi-annular gripping members partially surround said tubular member.

4. A fifth wheel pedestal according to claim 1 in which the gripped member is cylindrical, and the vertically recessed portions are of less width than the diameter of said gripped members.

5. A fifth wheel pedestal according to claim 4 in which the resilient means bear against the top recessed portions of said gripping members and the semi-annular gripping plate members are spaced apart more widely at their connections with said base structure than at their top portions whereby when said gripped members are moved from said recessed portions, said opposing gripping plates will urge said gripped members and said load carrying structure toward the horizontal inoperative position.

References Cited in the file of this patent

UNITED STATES PATENTS

| | | |
|---|---|---|
| 1,646,333 | Whitney | Oct. 18, 1927 |
| 1,885,384 | Snow | Nov. 1, 1932 |
| 2,036,344 | Menhall | Apr. 7, 1936 |
| 2,099,288 | Allen | Nov. 16, 1937 |
| 2,243,713 | Maruhn | May 27, 1941 |
| 2,653,781 | Niemeier | Sept. 29, 1953 |